(12) United States Patent
Abate

(10) Patent No.: US 8,336,847 B2
(45) Date of Patent: Dec. 25, 2012

(54) INJECTION CO-MOLDING AND ASSEMBLING METHOD AND APPARATUS FOR ARTICLES MADE OF PLASTIC MATERIAL HAVING PARTS CONNECTABLE BY HINGING DURING A DEMOLDING STEP

(75) Inventor: Davide Abate, Calcinato (IT)

(73) Assignee: ABATE BASILIO & C. S.n.c., Calcinato, Brescia (IT)

( * ) Notice: Subject to any disclaimer, the term of this patent is extended or adjusted under 35 U.S.C. 154(b) by 1244 days.

(21) Appl. No.: 12/092,976

(22) PCT Filed: Nov. 2, 2006

(86) PCT No.: PCT/EP2006/010534
§ 371 (c)(1),
(2), (4) Date: May 8, 2008

(87) PCT Pub. No.: WO2007/054235
PCT Pub. Date: May 18, 2007

(65) Prior Publication Data
US 2008/0280082 A1 Nov. 13, 2008

(30) Foreign Application Priority Data

Nov. 8, 2005 (IT) .............................. MI2005A2125
May 22, 2006 (IT) .............................. MI2006A1008

(51) Int. Cl.
*B29C 65/58* (2006.01)

(52) U.S. Cl. .............. 249/58; 249/68; 249/98; 425/577; 425/DIG. 5; 425/DIG. 59; 425/DIG. 121

(58) Field of Classification Search .................. 425/577, 425/588, DIG. 5, DIG. 10, DIG. 12, DIG. 58, 425/DIG. 59, DIG. 121; 249/58, 64, 68, 249/98, 122

See application file for complete search history.

(56) References Cited

U.S. PATENT DOCUMENTS

| 3,477,095 A | | 11/1969 | Lensky | |
|---|---|---|---|---|
| 3,861,840 A | * | 1/1975 | Heisler | 425/130 |
| 3,905,740 A | * | 9/1975 | Lovejoy | 425/438 |
| 4,125,246 A | * | 11/1978 | Von Holdt | 249/58 |
| 4,172,577 A | * | 10/1979 | Von Holdt | 249/58 |
| 4,210,620 A | * | 7/1980 | von Holdt | 264/163 |
| 4,383,819 A | * | 5/1983 | Letica | 425/577 |

(Continued)

FOREIGN PATENT DOCUMENTS
EP      0 912 411 B1    11/1999
(Continued)

*Primary Examiner* — Yogendra Gupta
*Assistant Examiner* — Emmanuel S Luk
(74) *Attorney, Agent, or Firm* — Young & Thompson

(57) ABSTRACT

Method and apparatus for injection co-molding and assembling of articles made of plastic material, the articles having a first part provided with a hinge pin, and a second part provided with an annular element designed to be connected to each other by hinging. The apparatus includes a mold having separate mold cavities for two parts of the article to be produced; a first molding member, defining the mold cavity of the pin, and a second molding member, defining the mold cavity of the annular element, are axially movable and operatively connected to cam control elements forming part of the same injection mold. The cam control elements are shaped and arranged to cause, after the opening of the mold, the automatic assembling of the plastic article, via a selective sequence of axial movements of the two molding members, during the demolding step of the molded article.

7 Claims, 13 Drawing Sheets

U.S. PATENT DOCUMENTS

| | | | | |
|---|---|---|---|---|
| 4,476,083 | A | * | 10/1984 | von Holdt .................... 264/318 |
| 4,518,143 | A | * | 5/1985 | Blanchette ................... 249/142 |
| 4,632,357 | A | * | 12/1986 | Von Holdt ..................... 249/58 |
| 4,648,834 | A | * | 3/1987 | Von Holdt .................... 425/556 |
| 5,536,161 | A | * | 7/1996 | Smith .......................... 425/438 |
| 6,234,782 | B1 | | 5/2001 | Hansen |
| 7,264,465 | B2 | * | 9/2007 | Schwaiger et al. ........... 425/577 |
| 7,326,045 | B2 | * | 2/2008 | Knezovic ...................... 425/441 |
| 7,802,982 | B2 | * | 9/2010 | Ciccone et al. ............... 425/556 |
| 7,938,635 | B2 | * | 5/2011 | Heilman et al. .............. 425/101 |

FOREIGN PATENT DOCUMENTS

| | | |
|---|---|---|
| EP | 1 245 371 A1 | 10/2002 |
| EP | 1 386 712 A1 | 2/2004 |
| EP | 1 652 646 A2 | 5/2006 |
| JP | 60-6423 A | 1/1985 |
| WO | 93/13927 A | 7/1993 |
| WO | WO 9748612 A1 * | 12/1997 |

* cited by examiner

INJECTION CO-MOLDING AND ASSEMBLING METHOD AND APPARATUS FOR ARTICLES MADE OF PLASTIC MATERIAL HAVING PARTS CONNECTABLE BY HINGING DURING A DEMOLDING STEP

FIELD OF THE INVENTION

This invention refers to the manufacturing of articles made of plastic material comprising separate parts, which are assemblable and connectable by hinging during the demolding step from a mold.

In particular, the invention concerns a method and an apparatus for the injection co-molding of articles made of plastic material, the articles comprising separate parts respectively provided with a hinge pin and with an annular element, which can be automatically connected by hinging during a demolding step of the molded article from a mold, during the opening of the same mold.

PRIOR ART

In the manufacturing of thermoplastic material articles made by injection molding processes, in particular of articles composed of several parts which have to be assembled and connected to one another by hinging, for example in the manufacturing of containers provided with a support handle, there is a need to make use of methods and apparatuses capable of enabling a co-molding of the various parts and their automatic assembling directly inside the mold.

Methods and apparatuses for the co-molding of containers provided with a handle connected by hinging, are described for example in IT 1.260.680, EP 0 912 411, and U.S. Pat. No. 6,234,782.

In particular, IT 1.260.680 describes a press for the co-molding of containers provided with a handle, in which use is made of a demolding system, separate from the controls for opening the press, and in which the steps of opening the mold and of assembling the handle onto the container are carried out at separate stages, before the final demolding step the molded article.

EP 0 912 411 in turn shows an articulated connection between two parts of an article made of plastic material, the articulated connection comprising a hinge pin and an annular element which are molded simultaneously, in such a way as to come out joined together by means of suitable lacerable gates; subsequently, upon an at least partial removal of the article from the injection mold, the two parts of the articulated connection are then assembled together by breaking the same gates.

U.S. Pat. No. 6,234,782 illustrates an injection mold for manufacturing of a container provided with a handle, in which the handle is automatically assembled onto the container by means of an additional assembling device operated by a respective control cylinder, separate from the demolding device.

Solutions of this kind prove to be structurally complex; moreover they require cycle times considered to be high for quick-acting presses, in that the opening of the mold, the assembling of the parts and the demolding step must take place subsequently at separate moments.

OBJECTS OF THE INVENTION

The main object of this invention is to provide a method and an apparatus for injection co-molding of articles made of plastic material, the articles comprising parts hinged to one another, whereby it is possible to reduce the working cycle times, and carry out an automatic assembling of the parts directly in the mold, during the demolding step of the molded article.

A further object of the invention, is to provide an apparatus, as mentioned above, suitable for use in a conventional injection molding mold, whereby it is possible to exploit the linear movements of certain members of the same press to achieve the assembling of the parts, by means of a simple solution which does not require the use of additional devices and control systems.

Another further object of the invention, is to provide a method and an apparatus, as mentioned above, whereby it is possible to produce molded articles having thin thicknesses and/or having plane walls, without running the risk that the deformation of the parts due to their limited thickness and/or their geometry is such as to prevent the assembling operation of the same parts.

BRIEF DESCRIPTION OF THE INVENTION

According to a first feature of the invention, a method has been provided for the injection co-molding of articles made of plastic material, the articles comprising a first part provided with a hinge pin, and a second part provided with an annular element, designed to be hingedly joined together directly in the injection mold;
  in which the annular element and the hinge pin are molded in an axially aligned condition and subsequently snap-coupled together, characterised by the steps of:
  providing the mold with a first molding member defining a molding cavity for the hinge pin, and respectively with a second molding member defining a molding cavity for the annular element, the first and the second molding members being axially movable with respect to each other;
  providing said mold with cam control means shaped to selectively move said first and second molding member; and
  performing the assembling of the molded parts by coupling the annular element to the hinge pin during a demolding step for the molded article, by selectively operating a sequence of axial movements of said molding members, suitable for:
  causing a snap-on engagement of the annular element with the hinge pin, and respectively
  disengaging said molding members from the annular element and from the hinge pin, and subsequently completing the demolding of the molded article, with said first and second part in their assembled condition.

According to a further feature of the invention an apparatus has been provided for the injection co-molding of articles made of plastic material, the articles comprising a first part provided with a hinge pin, and a second part provided with an annular element, connectable by hinging, the apparatus comprising:
  an injection mold, defining the molding cavities for a first and a second part of an article made of plastic material;
  a demolding device linearly movable in an axial direction;
  characterised by comprising a first and a second molding member defining the cavities of the annular element and of the hinge pin, said molding members being coaxially movable with respect to each other; and
  cam control means for selectively moving said molding members between a forward molding condition, an assembling condition and a backward condition for disengagement from the pin and the annular hinge element;
  said molding members being supported by a movable component of the mold, forming part of the demolding device.

BRIEF DESCRIPTION OF THE DRAWINGS

The invention will be described in greater detail hereunder with reference to the accompanying drawings, in which.

Figure 14:
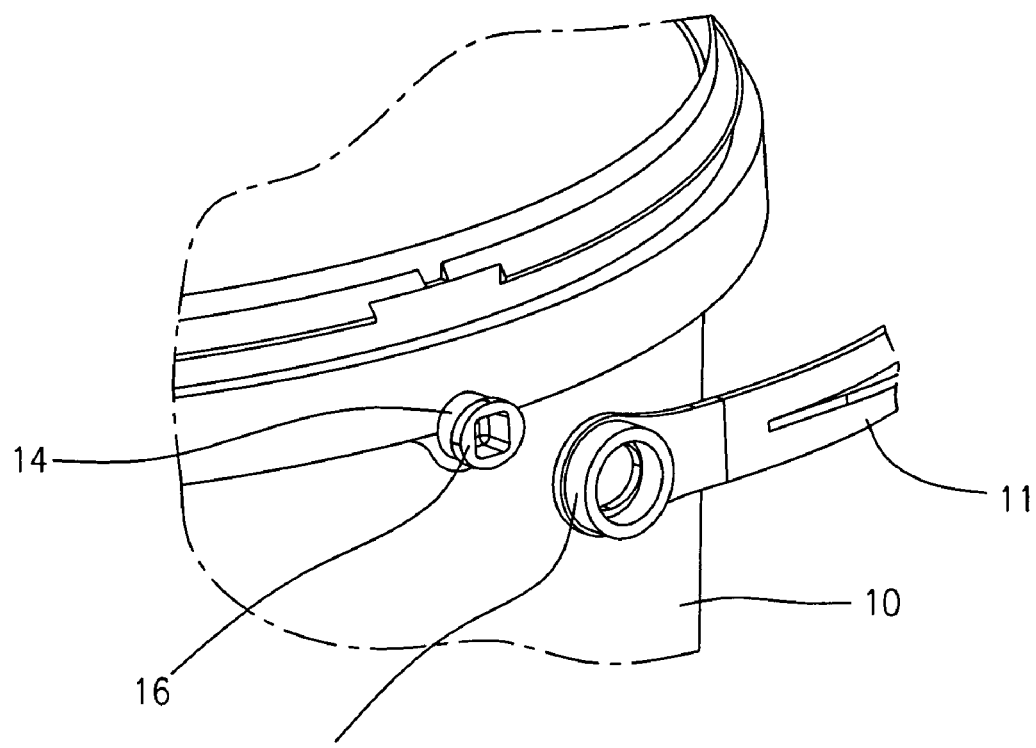
Figure 15:
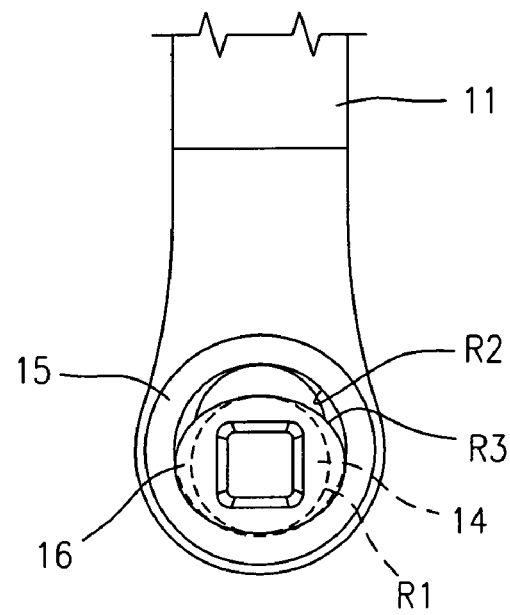
Figure 16:
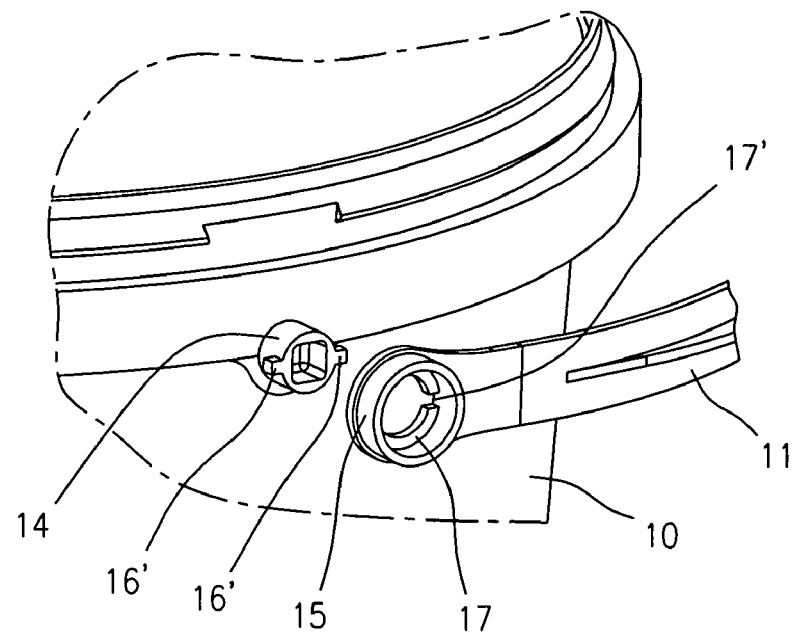
Figure 17:
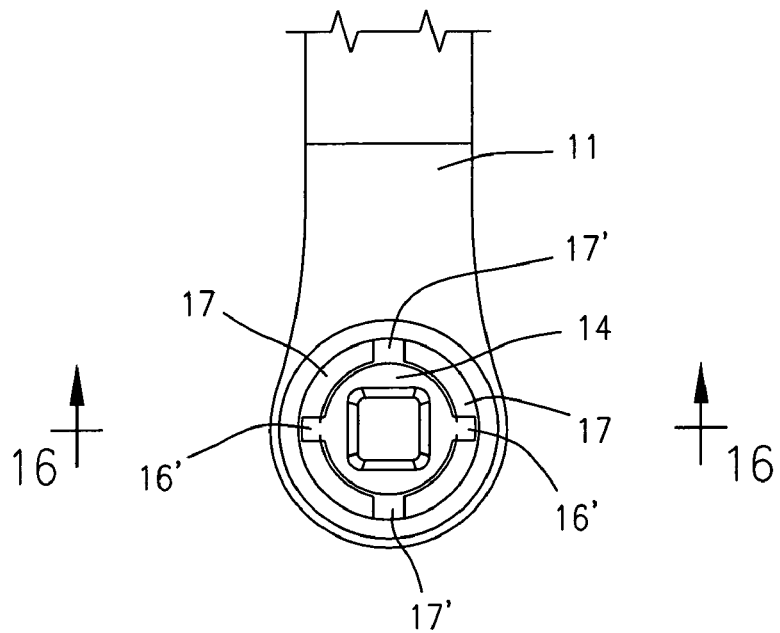
Figure 18:
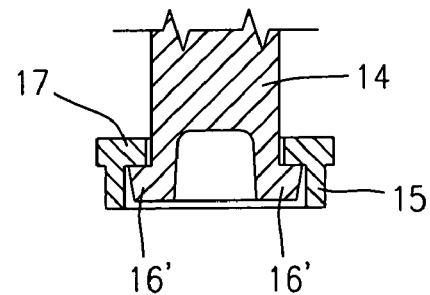
Figure 19:
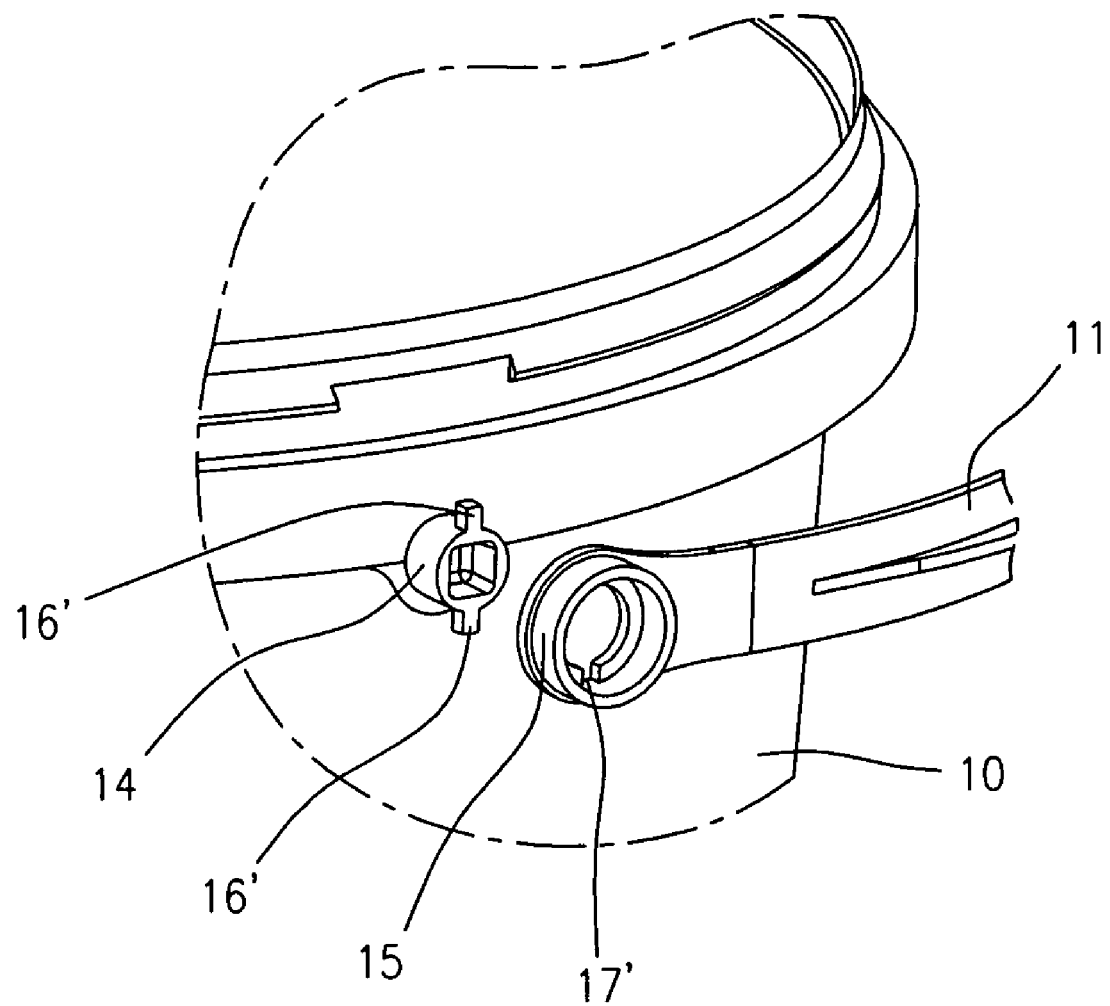
Figure 20:
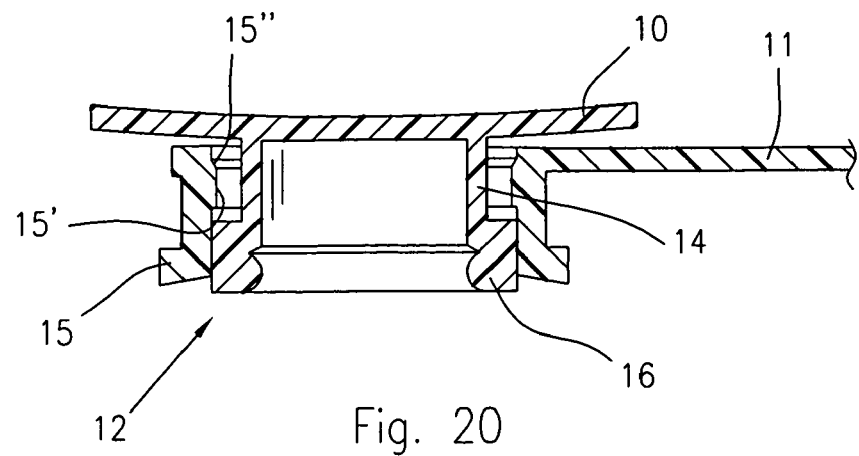
Figure 26:
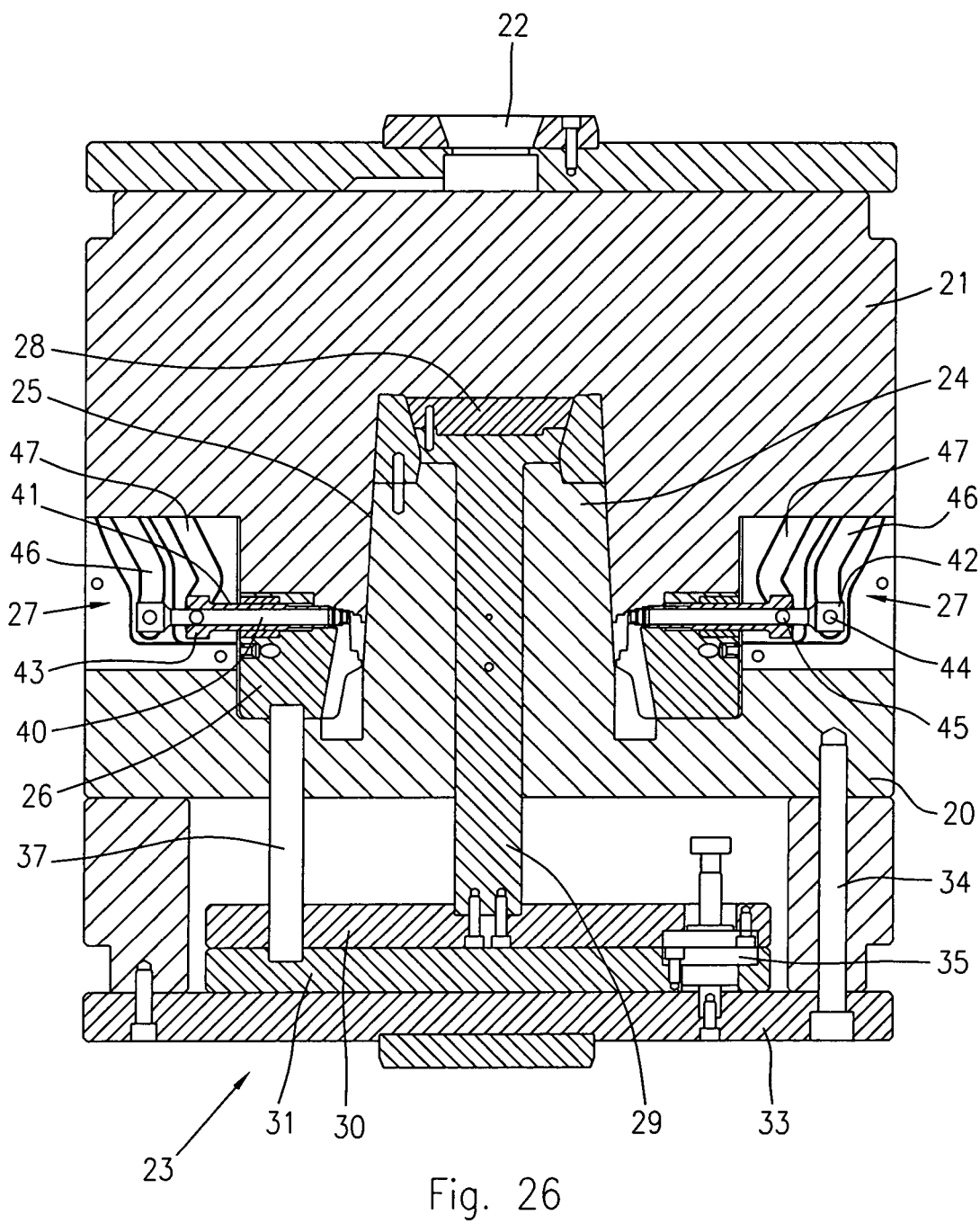

FIGS. from 6 to 13 show general views and enlarged details, designed to illustrate the main steps of assembling and demolding of the molded article;

FIG. 14 shows an exploded view of a second type of hinge joint;

FIG. 15 shows a front view of the hinge joint of FIG. 14;

FIG. 16 shows an exploded view of a third type of hinge joint;

FIG. 17 shows a front view of the hinge joint of FIG. 16;

FIG. 18 shows a cross-sectional view along the line 18-18 of FIG. 17;

FIG. 19 shows an exploded view of a fourth hinge joint;

FIG. 20 shows a cross section of a further type of joint between a hinge pin and an annular element, respectively of a molded container and of the relevant supporting handle;

FIGS. from 21 to 25 show enlarged details of the molding members according to a second embodiment of the invention, designed to illustrate the main steps of assembling of the molded article;

FIG. 26 shows a longitudinal cross-sectional view of a closed mold, forming part of the apparatus according to the second embodiment of the invention.

DETAILED DESCRIPTION OF THE INVENTION

The method and the apparatus according to the invention, will be described in greater detail hereunder with reference, by way of example, to the co-molding and assembling of a container and of the relevant supporting handle; however, the invention is understood to be applicable to the co-molding of parts connectable by hinging forming parts of any injection molded article made of plastic material.

Figure 1:
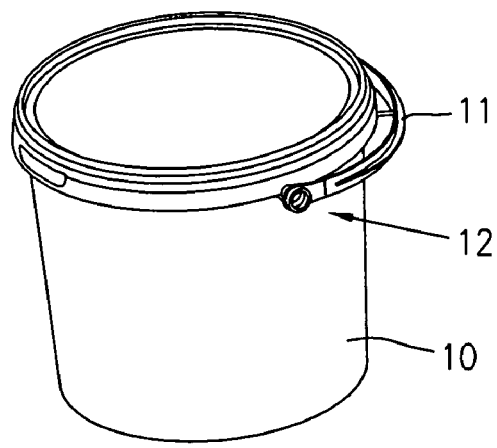
FIG. 1 shows a perspective view of a container provided with a handle co-molded and assembled according to the invention.

In the FIGS. from 1 to 3, reference number 10 has been used to indicate a generic molded container of plastic material, provided with a supporting handle 11, co-molded with the container 10, which are designed to be assembled directly in the mold and hinged in diametrically opposite positions, by means of a joint indicated as a whole by reference number 12, only one of which is visible in FIG. 1.

Figure 2:
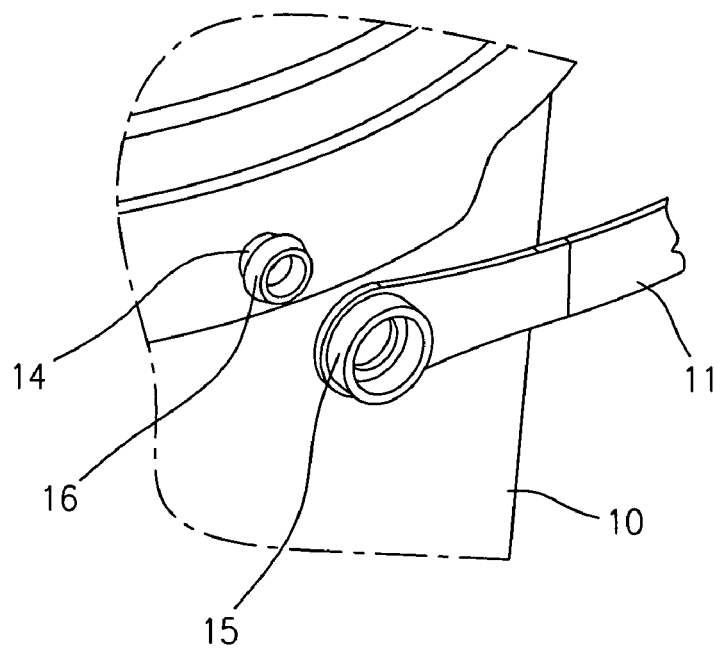
FIG. 2 shows an enlarged detail of FIG. 1.
Figure 3:
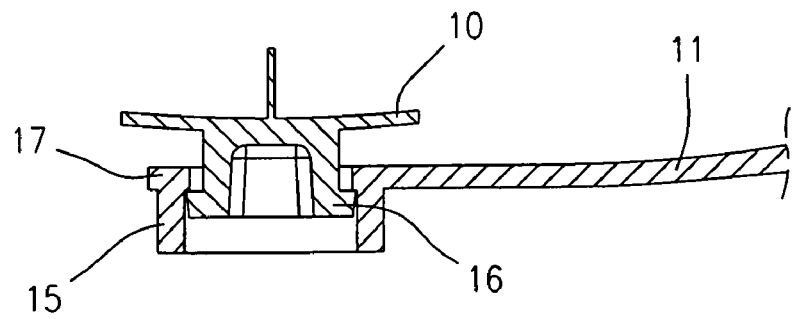
FIG. 3 shows a cross-sectional view of the hinge joint of FIG. 2.

In the example in question, as shown in the exploded view of FIG. 2, and in the cross-sectional view of FIG. 3, the joint comprises a hinge pin 14 radially protruding from the container 10, and an annular element 15 at one end of the handle 11, the annular element 15 providing an extensive supporting surface for the pin 14, onto which is discharged the entire weight of the completely filled container, as explained further on.

The hinge pin 14 and the annular element 15 may be shaped in any way, provided that they are suitable for snap-on coupling by means of an axial thrust, by exploiting the elastic yielding of the plastic material.

In the case of FIGS. 2 and 3, the cylindrical pin 14 has a slightly conical-shaped head 16, designed to be snap forced into the hole in the ring 15 to prevent it from slipping out, while at the same time allowing the rotation of the handle 11.

Figure 4:
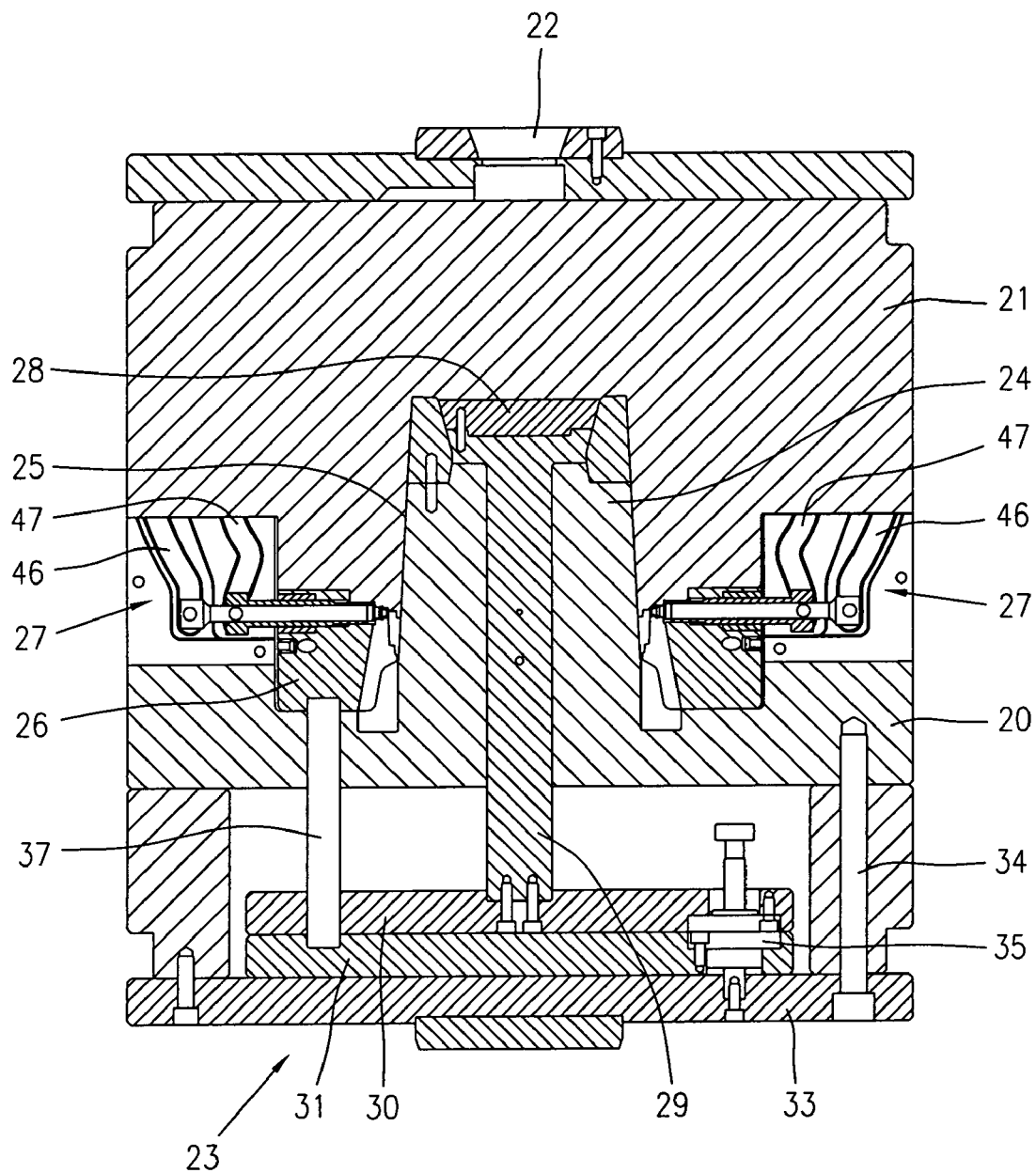
FIG. 4 shows a first longitudinal cross-sectional view of a closed mold, forming part of the apparatus according to a first embodiment of the invention.
Figure 5:
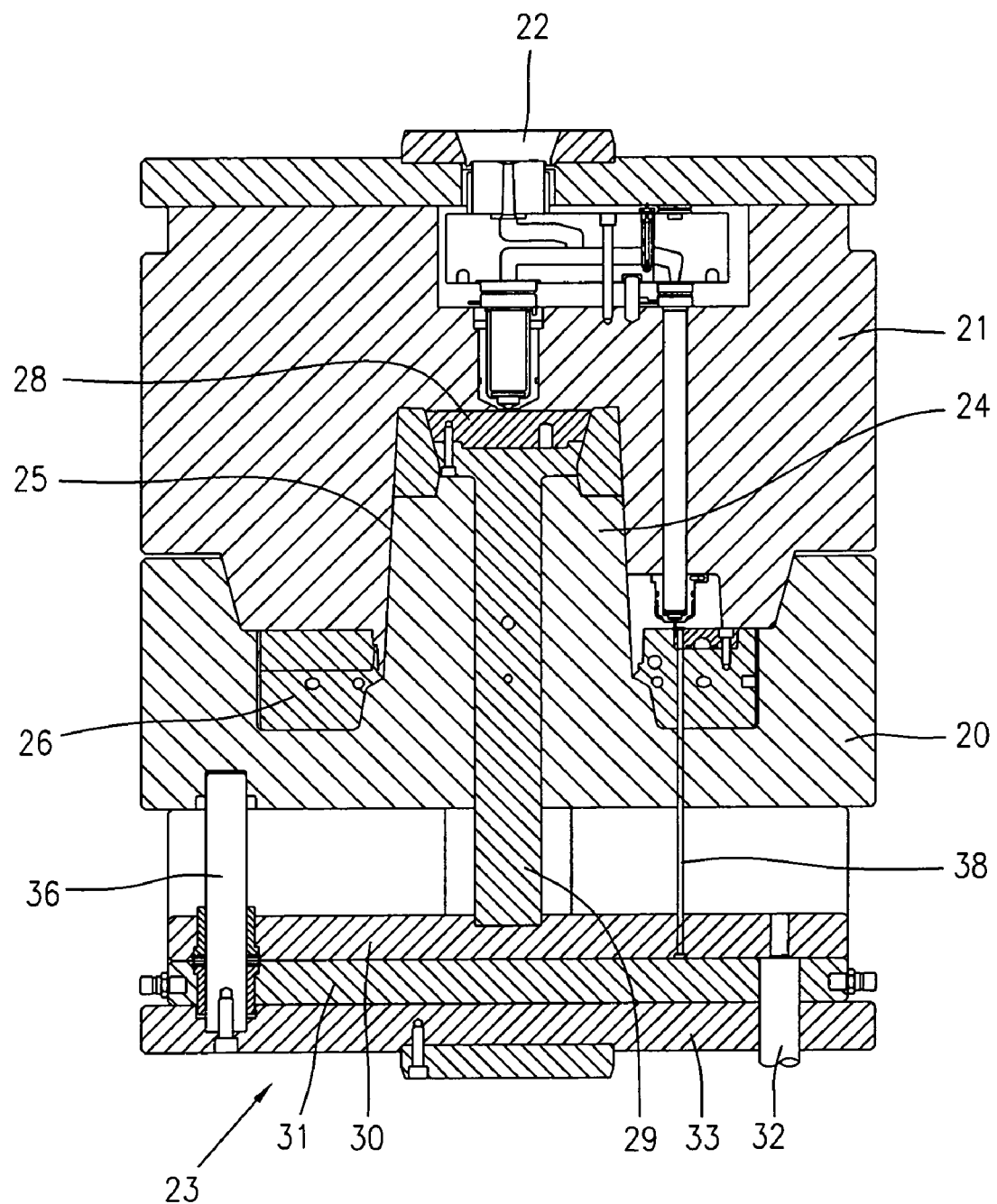
FIG. 5 shows a second longitudinal cross-sectional view on a different plane of the mold of FIG. 4.

With reference to FIGS. 4 and 5 a description will now be given, by way of example, of an apparatus according to a first embodiment of the invention, suitable for the co-molding of the container 10 and of the handle 11, by means of any injection molding press.

As shown, the apparatus comprises an injection mold suitable for co-molding the container 10 and the handle 11 in separate cavities, by means of the same plastic material or by means of different plastic materials.

The mold comprises a first mold part 20 and a second mold part 21, designed to be secured to the plates of a conventional injection press which, in their closed condition, define the molding cavities for molding the container 10 and the handle 11, into which is injected a thermoplastic material in the melted state, in a per se known way, for example through an injection hole 22 in the mold part 21. The molding cavities for the container 10 and for the handle can either be completely separate from each other or joined by one or more channels for the passage of the flow of melted plastic material, to facilitate the filling of the aforesaid molding cavities.

Lastly, reference number 23 has been used to indicate the assembly of a demolding device for the molded article, forming an integral part of the mold, the linear movements of which are advantageously used for assembling the handle 11 on the container 10 during the initial moments of the demolding step for the molded article, in accordance with this invention, as described further on.

The mold part 20 comprises a central core 24 designed to penetrate into a corresponding cavity in the mold part 21, to form a first molding cavity 25 of the container 10, as well as a second mold impression of the handle 11, not shown. The mold part 20 also comprises a demolding ring 26 disposed coaxially to the central core 24.

Two auxiliary molding assemblies 27, which cooperate to form the molding cavity of the hinge pin 14 and of the ring 15 of the handle with respective cam control systems, are associated with the mold part 20 to move with the demolding ring 26.

Still with reference to FIGS. 4 and 5, the demolding device 23 comprises a central thrust member, having a mushroom-shaped head 28 in contact with the bottom wall of the container 10, from which extends rearwardly a shank 29 secured to a first plate 30; the plate 30 is subject to the action of thrust rods 32, actuated by linear movements of the injection press, only one of which is shown in FIG. 5.

A second plate 31 is interposed between the first thrust plate 30 and a third plate 33 secured to the mold part 20 by means of stay bolts 34, only one of which is shown in FIG. 4.

The plates 30 and 31 are connected to each other by a disengageable coupling device 35, so as to be moved conjointly or separately by the thrust rods 32, as explained further on, guided in their movement by columns 36, one of which is shown in FIG. 5. The intermediate plate 31 is also provided with thrust columns 37, FIG. 4, to move the demolding ring 26 in the direction of the axis of the mold. Lastly, reference number 38 in FIG. 5 has been used to indicate a demolding rod for demolding of the handle, connected to the plate 30.

With reference to FIGS. from 6 to 13, a description will now be given of the two molding assemblies 27 for molding the pin 14 and the ring 15 for hinging the handle 11 to the container 10.

Figure 6:
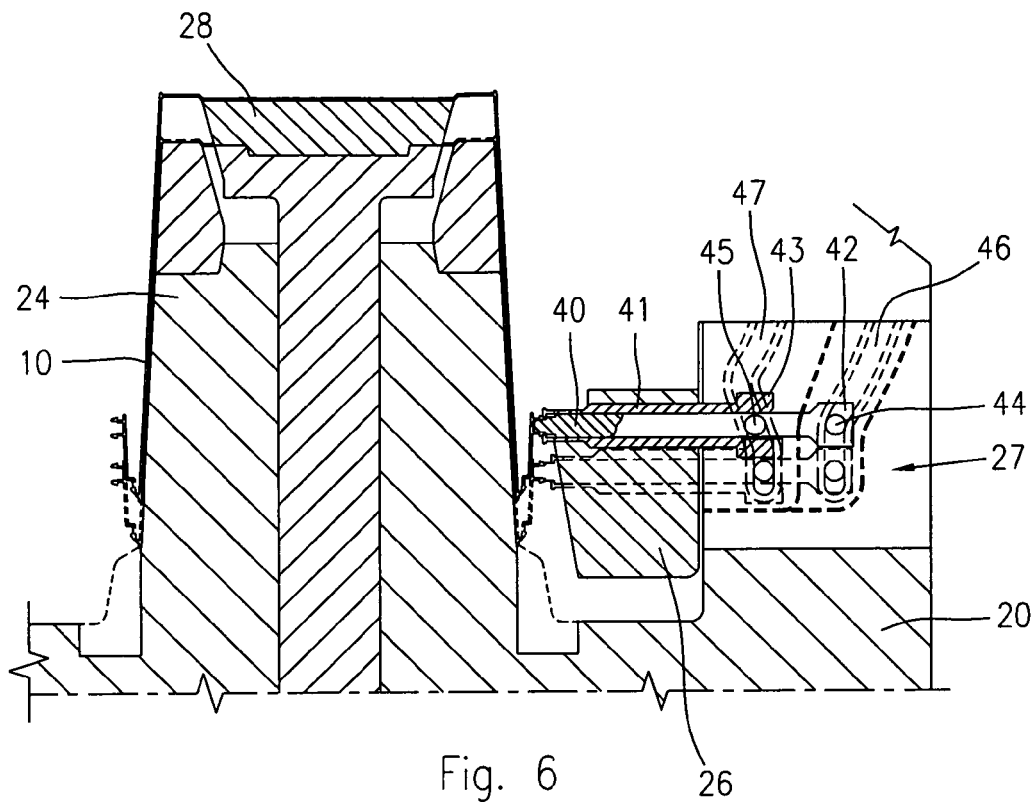
Figure 7:
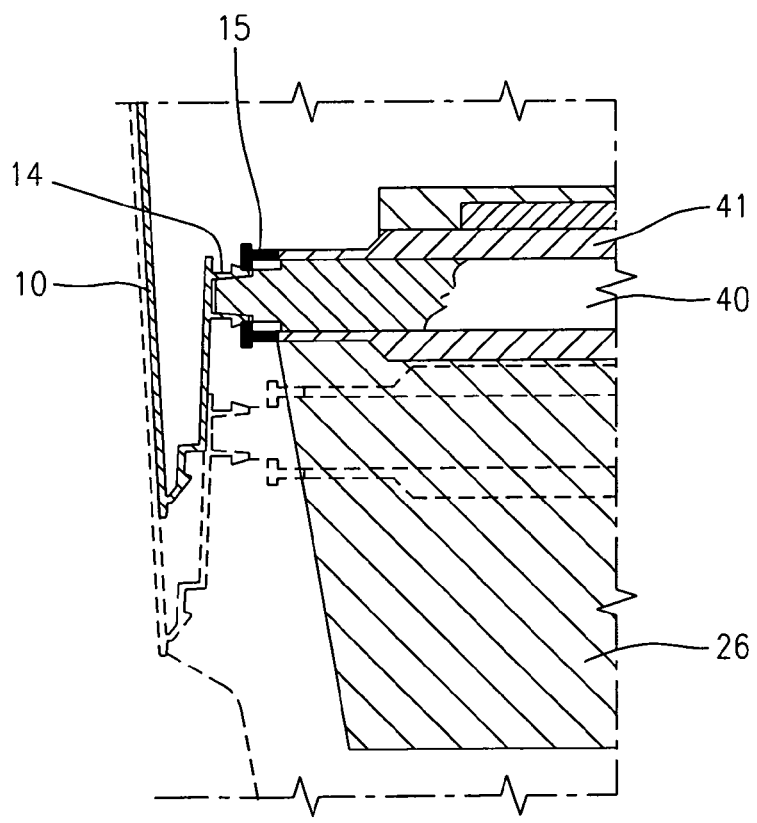

As shown in FIG. 6 and in the enlarged detail of FIG. 7, each assembly 27 comprises two coaxially arranged molding members which cooperate to form the molding cavities for the pin 14 of the container and for the ring 15 of the supporting handle 11.

More precisely, each auxiliary molding assembly 27 comprises a first solid pin (molding member) 40, shaped so as to define both the internal cavity of the hinge pin 14, and the internal cavity for the ring 15. The assembly also comprises a second tubular pin (molding member) 41, coaxially sliding on the internal pin (molding member) 40.

Both the pin (molding member) 40 and the pin (molding member) 41, end with a head 42, 43 provided with a cross stud 44, 45 sliding along the groove of a respective control cam 46, 47 suitably shaped to selectively control, in an independent and co-ordinate way, the forward and backward movements of the two pins (molding members) 40, 41, during the movement of the ring 26 at the beginning of the demolding step for the molded container.

The operative method of the mold is based on the steps referred to hereunder, illustrated in FIGS. from 6 to 13.

After the step of injecting the plastic material in the melted state, into the molding cavities of the container and of the handle, and after subsequent cooling, a step is started of opening the mold and demolding the finished article.

In particular, the opening of the press and the partial or total movement of the mold part 21 away from the mold part 20, is followed by the demolding step for the molded article.

During this step, the rods 32, exploiting the linear movements of the press, push forward the first demolding plate 30 together with the intermediate plate 31 to which it is mechanically connected by means of the coupling devices 35. The forward movement of the plates 30 and 31, causes the simultaneous forward movement of the central thrust member 28, 29, of the demolding ring 26 and of the demolding rod 38 of the handle. In this way the container 10 and the handle 11 begin to detach from their respective molding cavities.

This movement, in the direction of the axis of the mold, in particular of the demolding ring 26, is accompanied by a coordinated movement of the molding pins 40, 41 (molding members) which, following the two cams 46, 47, shift radially, performing such coordinated movements as to cause the coupling of the ring 15 to the hinge pin 14 in an aligned condition, by means of an axial thrust and a subsequent disengagement of the same pins to complete the demolding of the container and of the handle in an already assembled condition.

The method and the characteristics of the apparatus according to the invention, can be more clearly understood by reference to the FIGS. from 4 to 13 which clearly show the sequence of the basic operative steps, and the positions assumed by the pins of the two auxiliary molding assemblies 27, actuated by the respective cams, following the linear movements of the demolding device of the press.

FIG. 4 shows the initial position of the demolding ring 26 and of the two pins (molding members) 40 and 41, at the end of the molding step.

The initial position of the pins (molding members) 40 and 41 is also indicated, by a broken line, in FIG. 6 and in the enlarged detail of FIG. 7.

As can be seen in these figures, in their initial completely forward condition, the two pins (molding members) 40 and 41 cooperate with internal surfaces of the mold, to form the molding cavities of the hinge pin 14 and of the ring 15 of the supporting handle.

FIGS. 6 and 7 also show, by a continuous line, a second position of the ring 26 with the central mushroom shaped head 28 for demolding of the container 10 and of the pins (molding members) 40, 41, following a slight forward movement of the two plates 30 and 31.

As mentioned previously, the radial movements of the pins (molding members) 40 and 41 are controlled and coordinated by the respective cams 46 and 47; in the condition of FIGS. 6 and 7, following the first forward movement of the ring 26, the internal pin (molding member) 40 is shifted slightly backwards with respect to the hinge pin 14, while the tubular pin 41 is made to move forward pushing the ring 15 of the handle against the conical head 16 of the hinge pin; simultaneously, the container 10 also begins to be partially expelled from the mold part 20.

Figure 8:
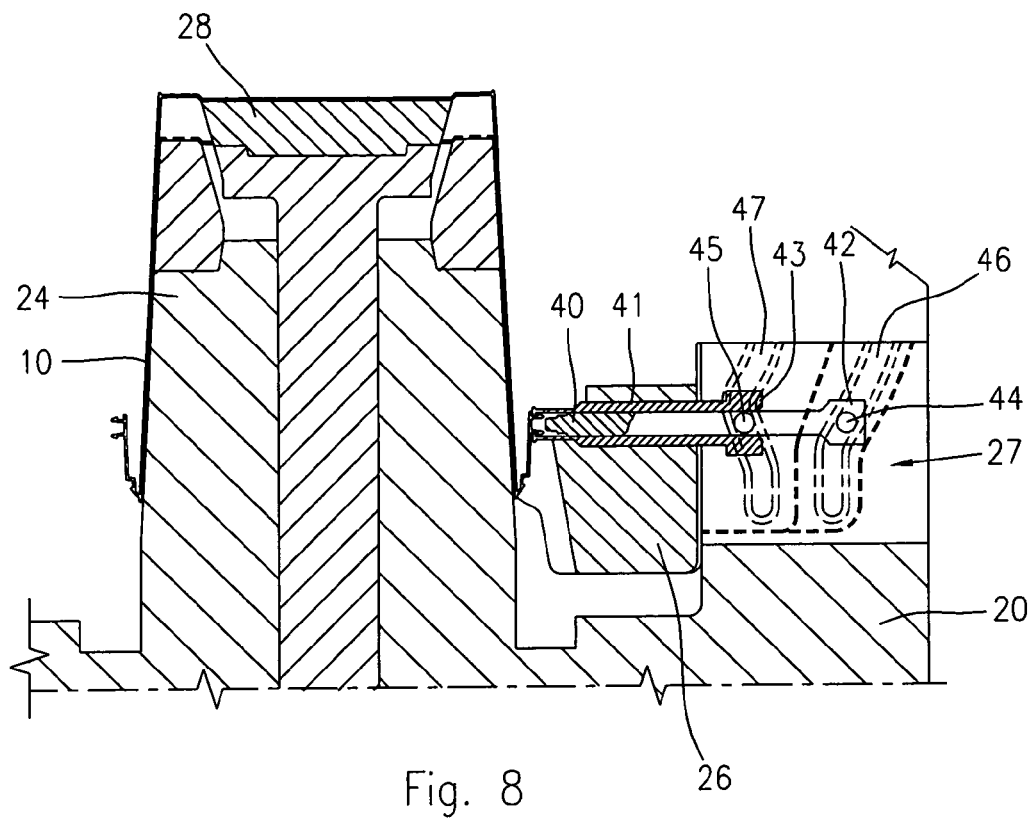
Figure 9:
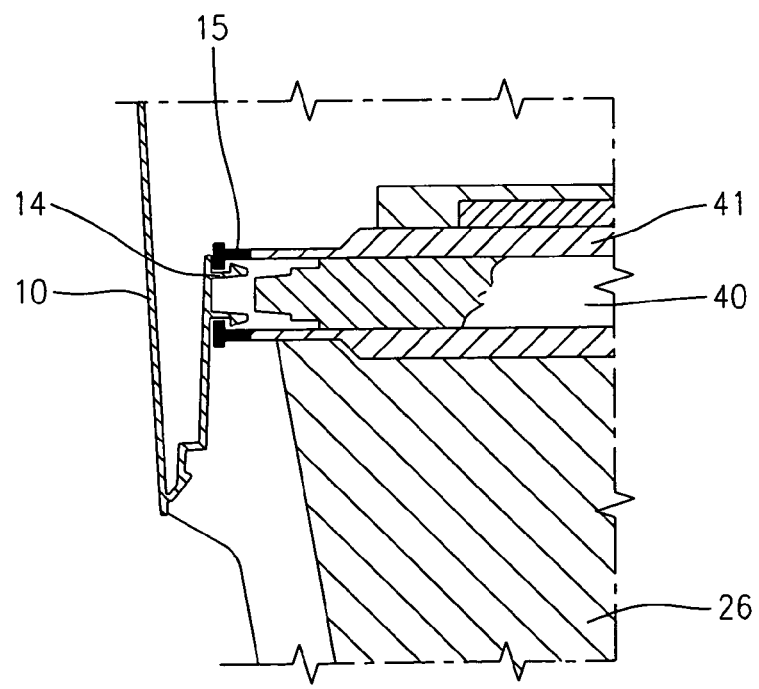

FIGS. 8 and 9 show a second condition during the step of demolding and assembling of the handle and the container, following a further shifting forward of the plates 30 and 31.

In this condition, as is clearly illustrated by the enlarged detail of FIG. 9, the pin 40 has been shifted further back until it comes out completely and disengages itself from the hinge pin 14. Conversely, the pin 41 has been made to move forward again, pushing the ring 15 of the handle so that it engages by snapping onto the hinge pin 14; during this initial phase of the demolding step, the assembling of the handle 11 and the container 10 takes place directly in the mold, during the same demolding.

Figure 10:
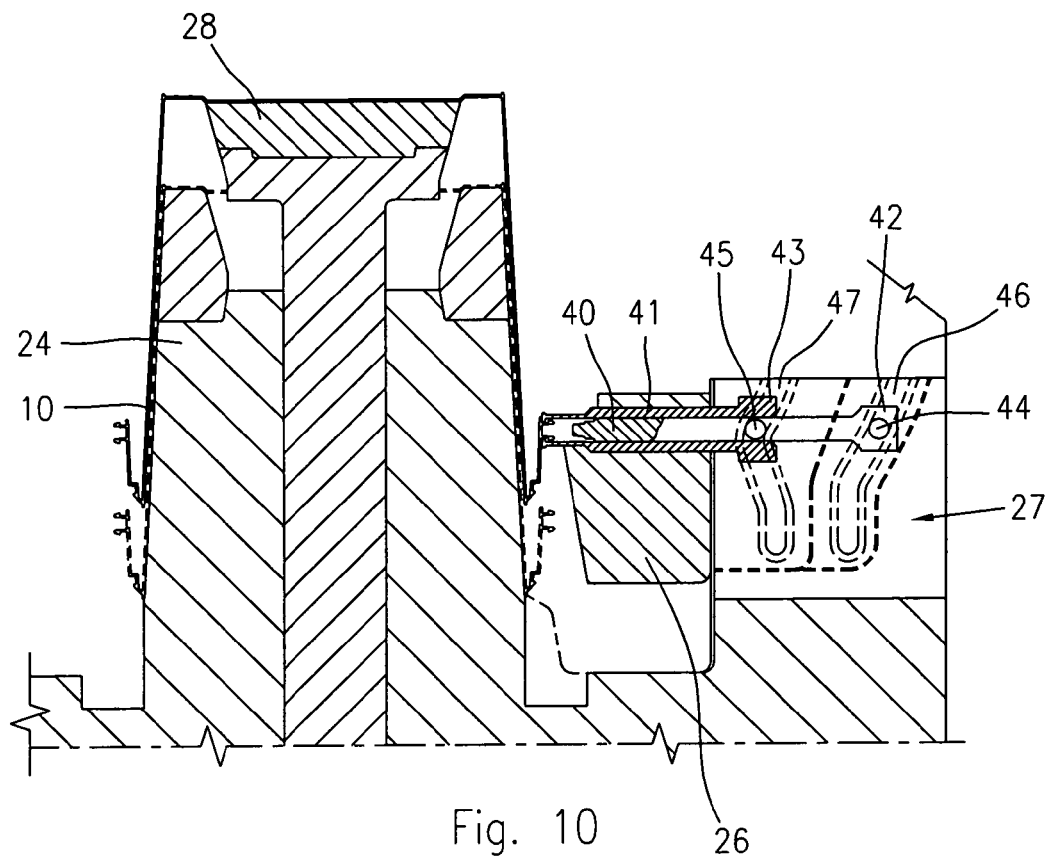
Figure 11:
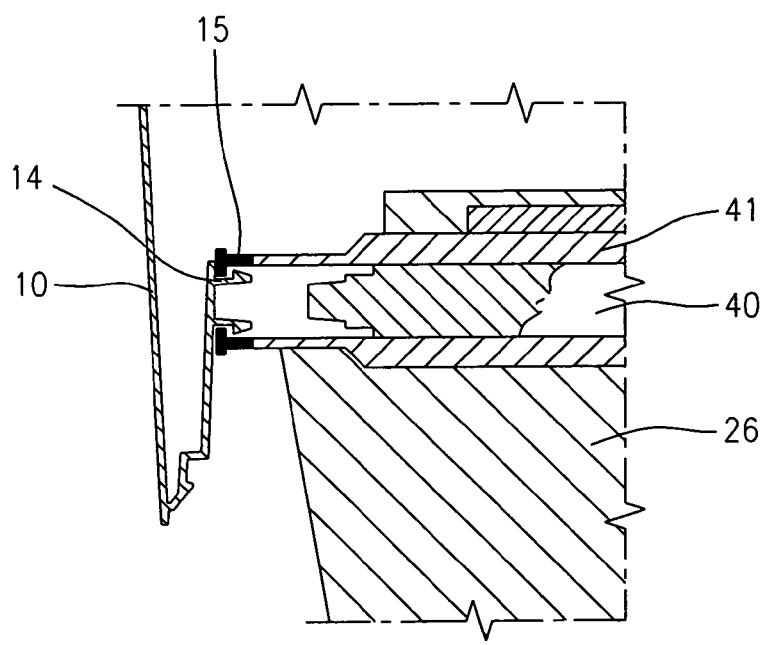

FIGS. 10 and 11 show a third intermediate condition, in which the internal pin (molding member) 40 has been shifted away even further, while the external pin (molding member) 41 remains in its forward position.

Figure 12:
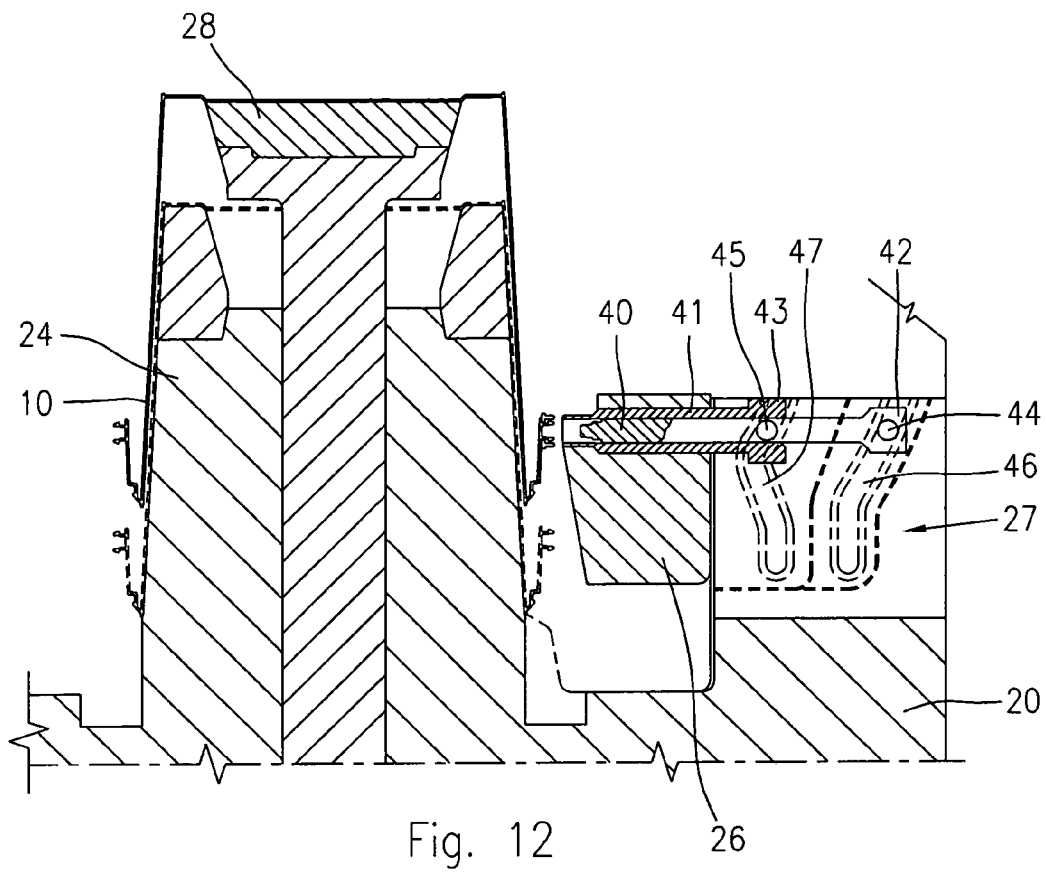
Figure 13:
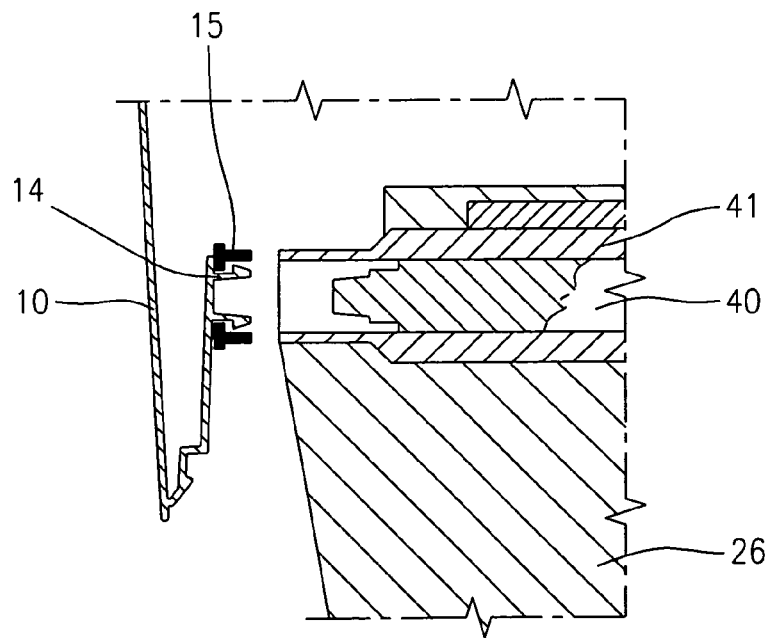

FIGS. 12 and 13 show a final condition, during the course of the de-molding step, in which both the pins (molding members) 40 and 41 have been shifted completely back, freeing both the hinge pin 14 and the ring 15 of the supporting handle.

At this point, the devices 35 are operated to free the plate 30 from the plate 31; continuing the movement of the rods 32, the container 10 with the handle 11 perfectly assembled, can be finally disengaged from the demolding ring 26, and expelled from the mold.

The step of assembling and coupling between the handle and the container, has been described and referred to the example of FIGS. 1-3; however, it is evident that the assembling step may also vary with respect to that shown, in relation to the different possible shapes of the hinge pins and the rings of the supporting handles, always with the aim of obtaining an efficient coupling.

In this connection, FIGS. 14 and 15 show a second possible solution for the hinge pin 14 and for the ring 15.

As can be seen in the two figures, the pin 14 is again cylindrically shaped, having a radius R1 smaller than the internal radius R2 of the ring 15. Conversely, the head 16 of the hinge pin is has a substantially oval shape, the major axis of which extends in a horizontal, or transversal direction to the axis of the container 10. The head 16 of the hinge pin, in the direction of its minor axis, in turn has a curvature radius R3 identical to the internal curvature radius R1 of the ring 15; the same ring 15, on the rear side facing towards the container, has an oval hole which adapts to the shape of the head 16, to allow the snap-on assembling, by means of a simple axial thrust of the molding pin (molding member) 41, as mentioned previously. Due to the correspondence of the curvature radiuses R2 and R3, it is also possible to obtain an extensive contact surface between the head 16 of the hinge pin and the ring 15 of the handle, in the vertical or raised position of the latter, shown in FIG. 15, which allows a greater distribution of the load between the pin 14 and the same ring 15.

FIGS. 16, 17 and 18 show a third solution for a hinge joint that can be assembled during the demolding step of the molded article, in accordance with the method of this invention.

In the case of FIGS. 16-18, the pin 14 is provided with two radial teeth 16' disposed horizontally with respect to the container 10, while the ring 15, in correspondence with the rear shoulder 17 is provided with two slits 17', aligned with the teeth 16' in the assembling condition inside the mold, shown in FIG. 16.

Both in this case, and in the previous cases of FIGS. 1-3, 14-16, as well as in the following case of FIG. 19, the coupling parts of the pins 14 and of the rings 15 must be made in such a way as to offer a slight interference in order to allow a reciprocal snap-on engagement, by means of the elastic yielding of the plastic material, preventing their subsequent disengagement, whatever position is assumed by the handle 11 with respect to the container 10.

FIG. 19 shows a fourth solution wholly similar to that of the previous example, the only difference being that now the teeth 16' have a vertical disposition; therefore, in FIG. 19 the same reference numbers have been used to indicate similar or equivalent parts.

FIG. 20 shows another solution for the hinge joint, which can be realised by a method and an apparatus according to a second embodiment of the present invention, as illustrated in FIGS. 21 to 26, in which the same reference numbers have been used to indicate similar or equivalent parts to those of the previous embodiment.

In particular, reference number 10 has been used again to indicate a generic container molded from plastic material, provided with a supporting handle 11, co-molded with the container 10, designed to be assembled directly in the mold and hinged in diametrically opposite positions by means of a joint indicated as a whole by reference number 12.

In the example in question, the joint comprises again a hinge pin 14 radially protruding from the container 10, and an annular element 15 at one end of the handle 11.

The hinge pin 14 and the annular element 15 may be shaped in any way, provided that they are suitable for quick coupling by means of an axial thrust, by exploiting the elastic yielding of the plastic material.

The pin 14 illustrated is cylindrically shaped and has a head 16, designed to be snap forced into the hole in the annular element 15 to prevent it from slipping out, while at the same time allowing the rotation of the handle 11.

In particular, the annular element 15 has an internal shoulder 15' designed to prevent the same annular element 15 from slipping off the pin 14 once they have been assembled together, by interference with the head 16.

Preferentially, the internal shoulder 15' has a conical lead-in surface 15" for coupling the annular element 15 onto the hinge pin 14; alternatively, the lead-in surface can be provided on the head 16 of the pin 14.

With reference to FIG. 26, a description will now be given, by way of example, to an apparatus according to the second embodiment of the invention, suitable for the co-molding of the container 10 and the handle 11, by means of any injection molding press.

As shown, the apparatus comprises an injection mold suitable for comolding the container 10 and the handle 11 in separate molding cavities, by means of the same plastic material or by means of plastic materials differing from each other.

The mold comprises again a first mold part 20 and a second mold part 21, designed to be secured to the plates of a conventional injection press which, in their closed condition, define the molding cavities for molding the container 10 and the handle 11, into which is injected a thermoplastic material in the melted state, in a per se known way, for example through an injection hole 22 in the mold part 21.

The mold part 20 comprises a central core 24 designed to penetrate into a corresponding cavity in the mold part 21, to form a first molding cavity 25 of the container 10, as well as a second mold molding cavity of the handle 11, not shown. The mold part 20 also comprises a demolding ring 26 disposed coaxially to the central core 24.

Two auxiliary molding assemblies 27, which cooperate to form the molding cavities of the hinge pin 14 and of the ring 15 of the handle with respective cam control systems, are associated with the mold part 20 to move together with the demolding ring 26.

A demolding device 23 comprises a central thrust member, having a mushroom shaped head 28 in contact with the bottom wall of the container 10, from which rearwardly extends a shank 29 secured to a first plate 30; the plate 30 is subject to the action of thrust rods, not shown, controlled by linear movements of the injection press.

A second plate 31 is interposed between the first thrust plate 30 and a third plate 33 secured to the mold part 20 by means of tie rods 34, only one of which is shown in FIG. 26.

The plates 30 and 31 are connected to each other by a disengageable coupling device 35, so as to be moved conjointly or separately by the thrust rods, as explained further on. The intermediate plate 31 is also provided with thrust columns 37, to move the demolding ring 26 in the direction of the axis of the mold. Lastly, a demolding rod, not shown, is provided for demolding of the handle, connected to the plate 30.

Still with reference to FIG. 26 and to the details shown in FIGS. from 21 to 25, a description will be given of the two molding assemblies 27 for molding the pin 14 and the ring 15 for hinging the handle 11 to the container 10.

In particular, each assembly 27 comprises two coaxial molding members which cooperate to form the molding cavities for the pin 14 of the container and of the ring 15 of the supporting handle 11.

More precisely, each auxiliary molding assembly 27 comprises a first solid pin (molding member) 40, shaped in such a cavity of the hinge pin 14 by one of its ends 40', as well as the internal molding cavity for the annular element 15 with part of the body of the same pin (molding member) 40.

Preferentially, according to such a second embodiment, the pin (molding member) 40 comprises on its body a continuous or discontinuous peripheral groove 40", defining the molding molding cavity for the internal shoulder 15' of the annular hinging element 15; the peripheral groove 40" is provided on one axial end with a conical surface 40''' shaped and disposed to form on the internal shoulder 15' the conical lead-in surface 15" for coupling the annular element 15 onto the hinge pin 14.

The assembly 27 also comprises a second tubular pin 41, sliding coaxially on the internal pin (molding member) 40.

Both the pin (molding member) 40 and the pin (molding member) 41, end with a head 42, 43 provided with a cross stud 44, 45 sliding along the groove of a respective control cam 46, 47 suitably shaped to selectively control, in an independent and co-ordinate way, the forward and backward movements of the two pins 40, 41, during the movement of the ring 26 at the beginning of the demolding step for the molded container.

According to this embodiment, the pin (molding member) 40 of the first molding member comprises disengageable means for axially retaining the hinge pin 14 during the coupling of the pin 14 itself with the annular element 15.

Preferentially, as illustrated in the FIGS. from 21 to 25, the axial retaining means comprise continuous or discontinuous peripheral toothing 50 on the pin (molding member) 40 of the first molding member, designed to engage with the hinge pin 14, during the injection molding of the pin 14 itself.

The operative method of the mold is based on the steps set forth hereunder, with reference to the FIGS. from 21 to 26.

After the step of injecting the plastic material in the melted state, into the molding cavities of the container and of the handle, and after a first cooling phase, a step is started of opening the mold and demolding the finished article.

In particular, the opening of the press and the partial or total movement of the mold part 21 away from the mold part 20, is followed by the demolding step of the molded article.

During this step, the linear movements of the press give rise to the simultaneous forward movement of the central thrust member 28, 29, the demolding ring 26 and the demolding rod for demolding of the handle. In this way the container 10 and the handle 11 begin to detach from their respective molding cavities.

This movement, in the direction of the axis of the mold, in particular of the demolding ring 26, is accompanied by a coordinated movement of the molding pins (molding members) 40, which, following the two cams 46, 47, shift radially, performing a coordinated movement such as to cause the coupling of the annular element 15 with the hinge pin 14 in an aligned condition, by means of an axial thrust and a subsequent disengagement of the same pins to complete the demolding of the container and the handle in an already assembled condition.

The method and the characteristics of the apparatus according to the invention, can be more clearly understood by reference to the FIGS. from 21 to 25 which clearly show the sequence of the basic operative steps of the assembling of the annular element 15 on the pin 14, and the positions assumed by the pins (molding members) 40, 41 of the two auxiliary molding assemblies, controlled by the respective cams, following the linear movements of the demolding device of the press.

Figure 21:
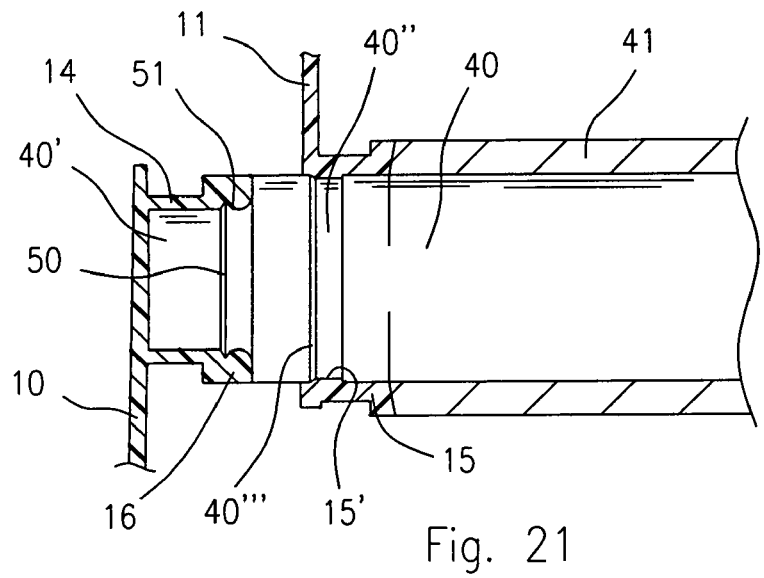

FIG. 21 shows the initial position of the two pins (molding members) 40 and 41, at the end of the molding step.

As can be seen in this figure, in their initial condition, the two pins (molding members) 40 and 41 cooperate with internal surfaces of the mold, to form the molding molding cavities of the hinge pin 14 and of the ring 15, with the relevant shoulder 15, of the sup-porting handle.

In particular, during the injection molding, the peripheral toothing 50 on the pin 40 of the first molding member, engages with the pin 14, in that the pin 14 is overmolded on the end 40' of the same pin 40 (molding member), thereby enabling the toothing 50 to exert its retaining action once the material has acquired the necessary resistance, after a first cooling step.

Figure 22:
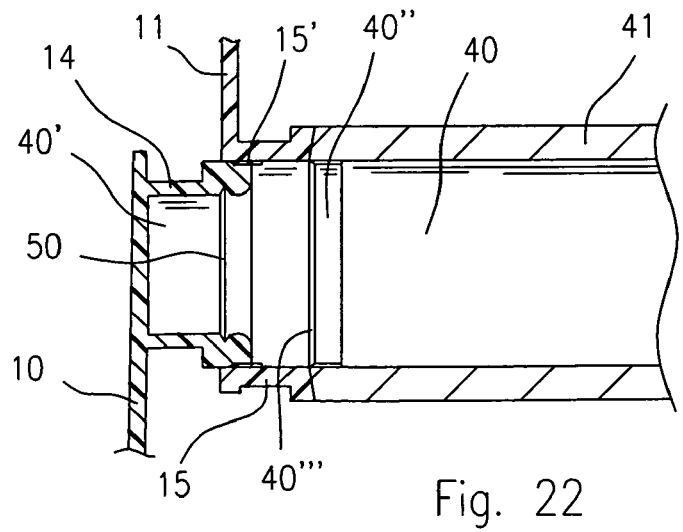

As mentioned previously, the radial movements of the pins (molding members) 40 and 41 are controlled and coordinated by the respective cams 46 and 47; in the condition of FIG. 22, following the first forward movement of the ring 26, the tubular pin 41 is made to move forward pushing the annular element 15 of the handle, towards the head 16 of the hinge pin.

During this step, there is a radial dilation of the annular element 15, in that the pin (molding member) 41, by its forward movement, forces the shoulder 15' out of the peripheral groove 40" of the pin (molding member) 40, causing it to slide over the conical surface 40''' of the groove 40" itself, and causing the shoulder 15' itself to slide on the body of the pin (molding member) 40, which is of a greater diameter than the groove 40".

In this way, providing that the diameter of the body of the pin (molding member) 40 is equivalent to the external diameter of the head 16 of the pin 14, the axial stresses that the annular element 15 exerts on the head 16 of the pin 14 during the coupling are considerably reduced, in that the radial dilation of the shoulder 15', and consequently of the annular element 15, necessary for the coupling itself takes place directly on the pin (molding member) 40, and not on the head 16 of the pin 14 as conventionally occurs.

Figure 23:
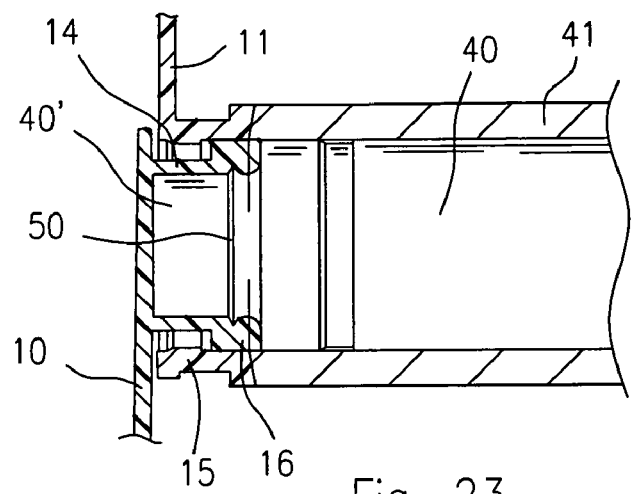

FIG. 23 shows a second condition during the step of demolding and assembling of the handle and the container; in this condition, the pin (molding member) 41 has again been made to move forward, forcing the ring 15 of the handle to engage by snapping onto the hinge pin 14; during this initial phase of the demolding step, the handle 11 and the container 10 are therefore assembled directly in the mold, during the course of the same demolding.

During the coupling of the annular element 15 to the hinge pin 14, the toothing 50 of the pin (molding member) 40 exerts an axial retaining action on the pin 14 itself; in this way, only a minimal part of the axial force exerted by the annular element 15 on the pin 14 is transferred and discharged onto the container 10, thanks to the axial retaining action exerted on the pin 14 itself.

Figure 24:
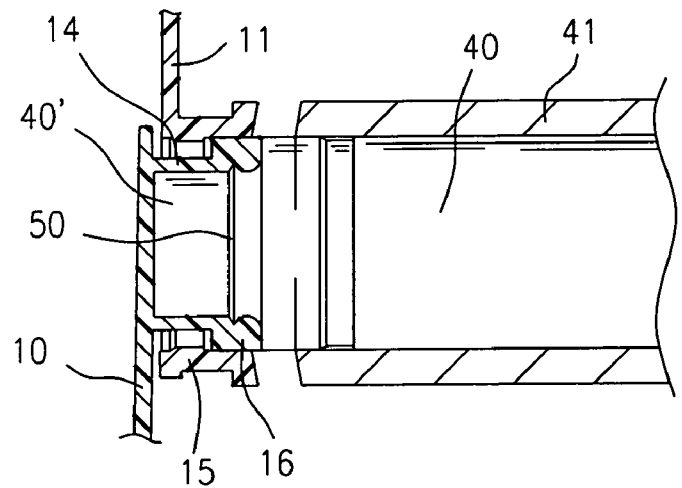

FIG. 24 shows a third intermediate condition, in which the internal pin (molding member) 40 has remained in its forward position, while the external pin (molding member) 41 has been made to move backwards, so as to release the head 16 of the pin 14 and thereby enable the pin 14 itself to dilate freely during the subsequent disengagement step of the toothing 50 of the pin 40 (molding member).

Figure 25:
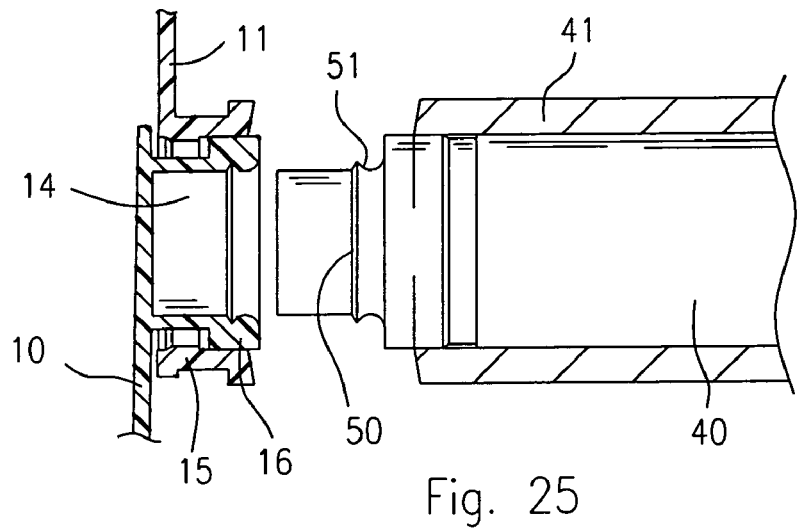

Lastly, FIG. 25 shows the final condition, during the course of the de-molding step, in which the pin (molding member) has also been made to move backwards, causing the disengagement of the retaining toothing 50 from the hinge pin 14, which is facilitated by the presence of an appropriate conical surface or fillet 51 provided on a rear side of the toothing 50, as illustrated in FIG. 25.

At this point, the container 10 with the handle 11 perfectly assembled, can be finally disengaged from the demolding ring 26, and expelled from the mold.

The step of assembling and coupling the handle and the container, has been described with reference to the example of FIGS. 20-25; however, it is obvious that the assembling step may also vary with respect to what has been shown, in relation to the possible different shapes of the hinge pins and the rings of the supporting handles.

The apparatus according to this embodiment of the invention, thanks to the retaining means of the hinge pin 14, and thanks to the fact that the dilation of the annular hinge element 15 occurs directly on the pin (molding member) 40, makes it possible to reduce to a minimum the stresses transmitted by the pin 14 to the container 10 during the assembling of the handle 11.

Therefore, it is possible to further reduce the work cycle times, in that it is no longer necessary to wait for the article to cool down completely before assembling it, which on the contrary is a necessary condition in the conventional systems in order to achieve the required degree of resistance to withstand the high forces that are generated during the assembling and thus avoid the possibility of a deformation of the container preventing the coupling of the elements.

Moreover, with the apparatus according to this invention, also due to the limited stresses transmitted to the container 10 during the assembling of the handle 11, it is possible to mold articles having thin thicknesses and/or having plane walls, without running the risk that an excessive deformation of the container under the effect of the axial assembling forces render the operation ineffectual.

From what has been described and shown, with reference to the examples of the accompanying drawings, it will be clear that a method and an apparatus are provided for the co-molding of articles made of plastic material, comprising separate parts assemblable and connectable by hinging during the demolding step from the mold, in order to achieve the previously mentioned objects. It is understood however that other modifications and/or variations may be made to the method, the apparatus, the hinge pins and rings of the supporting handle, in relation to given manufacturing requirements or to the type of article to be molded, without thereby departing from the scope of the claims.

The invention claimed is:

1. An injection molding apparatus adapted for co-molding and assembling a first part and a second part of a molded article in plastic material inside a mold, in which the first and second parts of the molded article are hingedly connected by hinge pins and annular hinge elements, the molding apparatus comprising:
   first and second mold members defining, between them, first and second molding cavities for said first and second parts of the molding apparatus comprising:
   the first mold member having a central core axially extending and conforming to said first molding cavity;
   a demolding device for the molded article, comprising a demolding ring coaxially and movably arranged in respect to the central core of the first mold member;
   in which the mold is provided with auxiliary molding assemblies each comprising coaxially arranged rod and tubular pin members slidably supported in a radial direction by the demolding ring;
   said rod and tubular pin assemblies being conformed to provide axially aligned molding cavities for the hinge pins and the annular hinge elements of the auxiliary molding assemblies; and
   cam control means on the first mold member, operatively connected to the rod and tubular pin members of the auxiliary molding assemblies, the cam control means being conformed and arranged to selectively control forward and backward movements of the rod and tubular pin members during the assembling of the first and second parts of the molded article, to engage the annular hinge member and the hinge pin by the movement of the demolding ring at the opening of the mold.

2. The apparatus according to claim 1, wherein the cam control means are conformed for selectively moving the rod member between a forward molding position, and a backward disengaged position from said hinge pin, and respectively for selectively moving the tubular pin member between a first molding position of the annular hinge element, a second forward position for assembling the annular hinge element on the hinge pin, and a third backward position for disengaging the tubular pin member from the annular hinge element and from the hinge pin.

3. The apparatus according to claim 1, wherein the cam control means are extending in an axial direction of movement of the demolding device.

4. The apparatus according to claim 1, said rod member comprises disengageable means for axially retaining the hinge pin member to said annular hinge element.

5. The apparatus according to claim 4, wherein said disengageable means comprises continuous or discontinuous peripheral toothing on hinge pin, the toothing being conformed to internally engage the hinge pin member, during the injection molding.

6. The apparatus according to claim 4, wherein said hinge pin member comprises a continuous or discontinuous peripheral groove said peripheral groove being provided on one axial end with a conical surface.

7. An injection molding apparatus adapted for co-molding and assembling a first part and a second part of a molded article in plastic material inside a mold, in which the first and second parts of the molded article are hingedly connected by hinge pins and annular hinge elements, the molding apparatus comprising:
   first and second mold members defining, between them, first and second molding cavities for said first and second parts of the molding apparatus comprising:
   the first mold member having a central core axially extending and conforming to said first molding cavity;
   a demolding device for the molded article, comprising a demolding ring coaxially and movably arranged in respect to the central core of the first mold member;
   in which the mold is provided with auxiliary molding assemblies each comprising coaxially arranged rod and tubular pin members slidably supported in a radial direction by the demolding ring;
   said rod and tubular pin assemblies being conformed to provide axially aligned molding cavities for the hinge pins and the annular hinge elements of the auxiliary molding assemblies; and
   a cam controller on the first mold member, operatively connected to the rod and tubular pin members of the auxiliary molding assemblies, the cam controller being conformed and arranged to selectively control forward and backward movements of the rod and tubular pin members during the assembling of the first and second parts of the molded article, to engage the annular hinge member and the hinge pin by the movement of the demolding ring at the opening of the mold.

* * * * *